United States Patent
Bhatnagar et al.

(10) Patent No.: US 9,496,980 B2
(45) Date of Patent: Nov. 15, 2016

(54) METHOD FOR DETECTING WAVELENGTH USAGE CONFLICTS IN AN OPTICAL NETWORK

(71) Applicant: Ciena Corporation, Hanover, MD (US)

(72) Inventors: Vipul Bhatnagar, Kensington, MD (US); David Bownass, Ottawa (CA); Giuseppe Bordogna, Ottawa (CA)

(73) Assignee: Ciena Corporation, Hanover, MD (US)

( * ) Notice: Subject to any disclaimer, the term of this patent is extended or adjusted under 35 U.S.C. 154(b) by 74 days.

(21) Appl. No.: 14/477,153

(22) Filed: Sep. 4, 2014

(65) Prior Publication Data

US 2016/0072609 A1 Mar. 10, 2016

(51) Int. Cl.
| | |
|---|---|
| *H04J 14/02* | (2006.01) |
| *H04Q 11/00* | (2006.01) |
| *H04B 10/079* | (2013.01) |
| *H04B 10/40* | (2013.01) |

(52) U.S. Cl.
CPC ....... *H04J 14/0263* (2013.01); *H04B 10/0799* (2013.01); *H04B 10/40* (2013.01); *H04Q 11/0005* (2013.01); *H04Q 11/0066* (2013.01); *H04Q 2011/0045* (2013.01); *H04Q 2011/0083* (2013.01); *H04Q 2011/0086* (2013.01)

(58) Field of Classification Search
CPC ........... H04J 14/0263; H04Q 11/0066; H04Q 11/0005; H04Q 2011/0045; H04Q 2011/0086; H04Q 2011/0083; H04B 10/0799; H04B 10/40
See application file for complete search history.

(56) References Cited

U.S. PATENT DOCUMENTS

| | | | |
|---|---|---|---|
| 5,790,287 A | 8/1998 | Darcie et al. | |
| 6,108,114 A * | 8/2000 | Gilliland | H04B 10/504 398/1 |
| 2007/0242625 A1* | 10/2007 | Dunne | H04J 14/0204 370/258 |
| 2013/0129346 A1 | 5/2013 | Zbinden et al. | |

FOREIGN PATENT DOCUMENTS

WO      2013068039 A1     5/2013

OTHER PUBLICATIONS

Extended European Search Report, issued Jan. 19, 2016 on applicant's corresponding European Application No. 15183764.8.

\* cited by examiner

*Primary Examiner* — Leslie Pascal
(74) *Attorney, Agent, or Firm* — Clements Bernard PLLC; Christopher L. Bernard; Lawrence A. Baratta, Jr.

(57) ABSTRACT

A method of adding a transceiver including a transmitter and a receiver to an optical network. The transceiver is controlled to enable the receiver while maintaining the transmitter in a disabled state. The receiver detects a presence of an optical signal at a first wavelength. If an optical signal at the first wavelength is not present, the transmitter is enabled. Responsive to detection that an optical signal at the first wavelength is present: a feature of the optical signal, and a match condition between the detected feature and a predetermined feature are detected. The transmitter is enabled responsive to detection of the match condition.

22 Claims, 6 Drawing Sheets

METHOD FOR DETECTING WAVELENGTH USAGE CONFLICTS IN AN OPTICAL NETWORK

CROSS-REFERENCE TO RELATED APPLICATIONS

This is the first application filed in respect of the present invention.

FIELD OF THE INVENTION

The present application relates generally to management systems for optical networks, and more specifically to method for detecting wavelength usage conflicts in optical networks.

BACKGROUND

In modern Wavelength Division Multiplexed (WDM) optical communications networks, it is a common practice to utilize passive MUX/DEMUX devices (for example using thin film filters) or dynamic switching (for example using Wavelength-selective switches and channel blockers) to control the routing of wavelength channels through the network.

A limitation of passive devices is that they are relatively static, in that the routing of wavelength channels is controlled by the physical structure of the filter. This means that in order to implement a change in the routing it is necessary to change the filter. In the case of an wavelength channel carrying customer data, there is no simple method of changing the routing without disrupting the customer data flow, which is highly undesirable.

Dynamic wavelength switching allows for a readily reconfigurable wavelength routing across the network. However, Wavelength-selective switches (WSSs) are expensive and require control software to correctly manage the state of the switch.

Alternative network architectures are known that do not perform any wavelength routing or blocking functions. In such architectures, wavelength channels are not routed across the network. Rather, they are effectively broadcast. FIG. 1 schematically illustrates a representative network architecture of this type. In the network of FIG. 1, a set of four nodes 2A-D are shown, each of which is connected to its neighbor by a pair of unidirectional fiber links 4L and 4R. Within each fiber link 4, WDM optical signals are propagated in the direction illustrated by arrows. Each node 2 comprises a Drop path 6 for coupling inbound light from a respective upstream fiber link 4 to a receiver 8, and an Add path 10 for coupling light from a transmitter 12 to a respective downstream fiber link 4. Typically, a transmitter 12 and a receiver 8 are combined into a transceiver 14, which is configured to transmit and receive optical signals at the same wavelength. Normally, each node 2 will comprise multiple transceivers 14, each of which configured to operate (that is, transmit and receive) at a respective different wavelength. For ease of illustration, only one transceiver 14 shown in each node 2.

The Drop path 6 comprises an optical coupler 16 (such as a 3dB splitter) for tapping light from a respective upstream fiber path and supplying the tapped light to the receiver of a transceiver. Typically, a node 2 will include multiple transceivers 14, in which case, the Drop path 6 may also include one or more optical splitters (not shown) for supplying Drop light to the respective receiver of each transceiver. As may be appreciated, the Drop path 6 supplies light of all of the channels active in the upstream fiber path 4 to the (or each) receiver 8. Accordingly, the receiver must be tuned to receive a selected one of the wavelength channels. In the case of coherent receivers, tuning can be achieved by suitable control of local oscillator in a manner known in the art. In the case of direct detection receivers, filters may be used to limit the spectral range of light admitted to the receiver 8.

The Add path 10 comprises an optical combiner 18 for adding light from the transmitter 12 of a transceiver 14 to a respective down-stream fiber path. Typically, a node 2 will include multiple transceivers 14, in which case the Add path 10 may include one or more optical combiners (not shown) for combining light from the respective transmitter of each transceiver. Preferably, the transmitter 12 of each transceiver 14 can be tuned to transmit within an optical channel centered on a desired wavelength. Various means of tuning transmitters in this manner are known in the art.

With the arrangement of FIG. 1, signals transmitted from any given node will propagate through the corresponding downstream fiber links and will be dropped to each receiver (s) coupled to the downstream fiber link. In the example, of FIG. 1, optical signals transmitted from Node A will propagate through the fiber link 4R, and be dropped to the receivers 8 in nodes C and D. Similarly, optical signals transmitted from Node C will propagate through the fiber link 4L, and be dropped to the receivers 8 in nodes A and B. This means that a communication link between node B and either one of nodes C and D can be established by tuning a respective transceiver in each node to a common wavelength. For example, FIG. 1 illustrates a scenario in which Nodes B and D are configured to communicate with each other using a wavelength channel identified as λ1. In the illustrated scenario the transmitter at Node B transmits an optical signal on λ1, which is added to Node B's downstream fiber link. As may be seen in FIG. 1, λ1 propagates through the fiber link 4R, and is coupled into the respective Drop path 6 of each of nodes C and D. As a result, bi-directional communication between Nodes B and D can be established by configuring a transceiver 14 in each node to operate at λ1.

An advantage of this architecture is that it eliminates the expense and complexity of conventional wavelength routing equipment. However, it also creates failure mechanisms that do not exist in conventional network architectures. A specific problem is that an optical signal transmitted by one node is effectively broadcast to every node in the network, not just the intended recipient node. This is illustrated in FIG. 1, in which λ1 is used to establish communication between nodes B and D, but is also propagated to nodes A and C as well. In the absence of wavelength channel routing or blocking devices, there is no means of preventing propagation of a wavelength channel to every node in the network. However, if the network has no capability for blocking wavelengths, then there is no means of preventing wavelength collisions in the network. For example, if a transceiver 14A in node A were to begin transmitting at λ1, then those signals would "collide" with the signals being exchanged between nodes B and D, and so interfere with communications between these two nodes.

In addition to the aforementioned optical network architecture with no wavelength blocking, the potential for wavelength conflict exists in conventional wavelength-routed networks which use a wavelength-independent power combiner as part of the multiplexing scheme. For example, in an Optical Add/Drop Multiplexer (OADM) it may be beneficial to use a wavelength-independent power combiner (e.g. having N input ports) to multiplex N transmitter outputs to a single fiber. However, with this arrangement, a wavelength collision can occur if a newly activated transmitter starts emitting light that spectrally overlaps with light emitted by a previously activated transmitter connected to the same N-port combiner. Such a collision would cause the previously activated transmitter's signal to be degraded by the interfering signal of the newly added transmitter.

As is known in the art, a "wavelength collision" refers to the insertion of a signal onto a network at a wavelength that is already in use by a pre-existing connection. The newly introduced signal would interfere with the pre-existing signals and would disrupt the pre-existing connection. It is therefore advantageous for any optical network to have the capability for avoiding wavelength collisions.

Typically, this problem is addressed by enforcing a network management policy of using a particular wavelength only once in the network. However, there is still a risk of disruption of an operational communications link, if a new link is erroneously activated at the same wavelength as the pre-existing link.

Conventional approaches to wavelength collision avoidance in networks without wavelength routing use a combination of channel blockers (for example at mux ports) and a spectral validation scheme. For example, when a wavelength channel is to be added to the network, the selected wavelength is first validated through either a direct measurement (e.g. using an Optical Signal Analyser) or through provisioning. The wavelength channel is then compared against a database, frequently stored within the local nodes' central processing unit, to determine if the wavelength is available for insertion on the network. If the database entry for that wavelength indicates that the wavelength is available, then the channel blocker at the mux port is released and the database updated to indicate that the newly inserted wavelength is now in use. However, this approach relies on multiplexers with port-level channel blockers, which tend to be expensive. In addition, the addition of the new wavelength channel must be communicated other nodes, either by OSA signalling or manually. Automated notification via OSA signalling increases signaling between nodes and requires that the Photonic Line have management visibility to transmitters, which may be part of a different product and/or managed independently. On the other hand, manual updates of local node databases are prone to human error.

Techniques that overcome at least some of the above-noted limitations of the prior art would be highly desirable.

SUMMARY

An aspect of the present invention provides a method of adding a transmitter and a receiver to an optical network. The receiver is enabled while maintaining the transmitter in a disabled state. The receiver detects a presence of an optical signal at a first wavelength. Responsive to detection that an optical signal at the first wavelength is not present, the transmitter is enabled. Responsive to detection that an optical signal at the first wavelength is present: a feature of the optical signal is detected, and a match condition is detected between the detected feature and a predetermined feature. The transmitter is enabled responsive to detection of the match condition.

Another aspect of the present invention provides an apparatus for use in an optical network. The apparatus comprises: a transmitter configured to transmit an optical signal into the optical network; a receiver configured to receive an optical signal via the optical network; and a controller for controlling the transmitter and the receiver. The controller is configured to enable the receiver while maintaining the transmitter in a disabled state. A presence of an optical signal at a first wavelength is detected using the receiver. Responsive to detection that an optical signal at the first wavelength is not present, the controller enables the transmitter. Responsive to detection that an optical signal at the first wavelength is present: a feature of the optical signal is detected, and a match condition is detected between the detected feature and a predetermined feature. The transmitter is enabled responsive to detection of the match condition.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

In one aspect, the present technique provides an apparatus in which a controller is configured such that the receiver and transmitter functions can be activated independently of each other. In another aspect, the present technique provides methods by which this capability is used to prevent a wavelength collision. In another aspect, the present technique provides a system for automatically selecting an available wavelength for establishing bidirectional communications between a pair of transceivers in a network that does not have any wavelength routing or blocking functionality. In another aspect, the present technique provides a system for detecting potential wavelength conflicts in a network.

Figure 1:
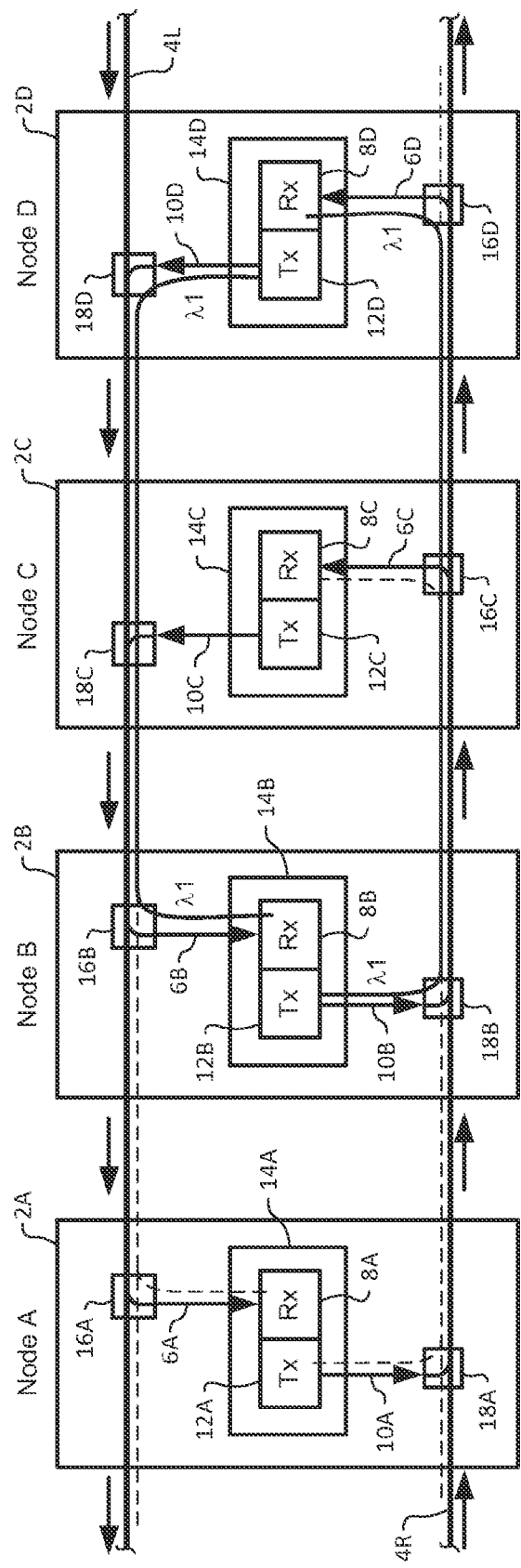
FIG. 1 is a block diagram schematically illustrating a representative network architecture of a type in which the present invention may be used.
Figure 2A:
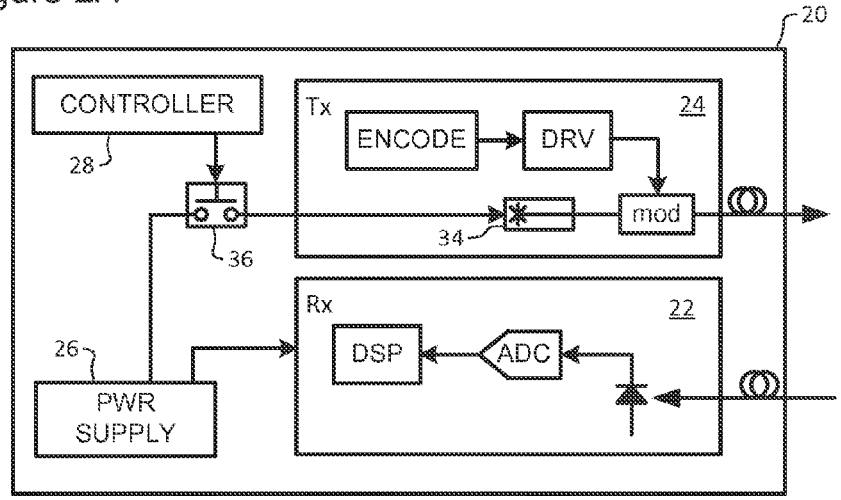
FIGS. 2A-2C schematically illustrate respective optical transceivers.
Figure 2B:
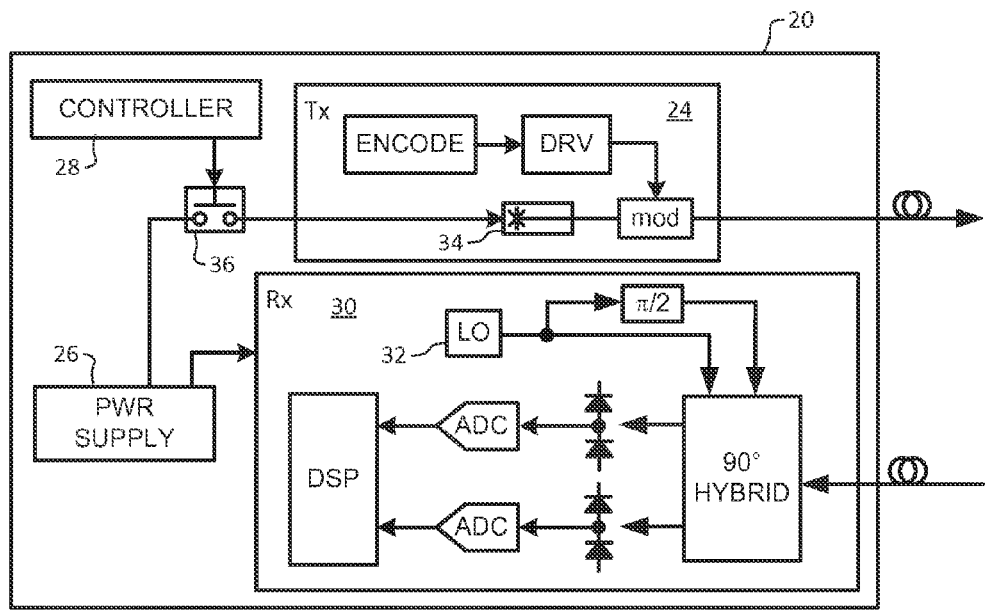
Figure 2C:
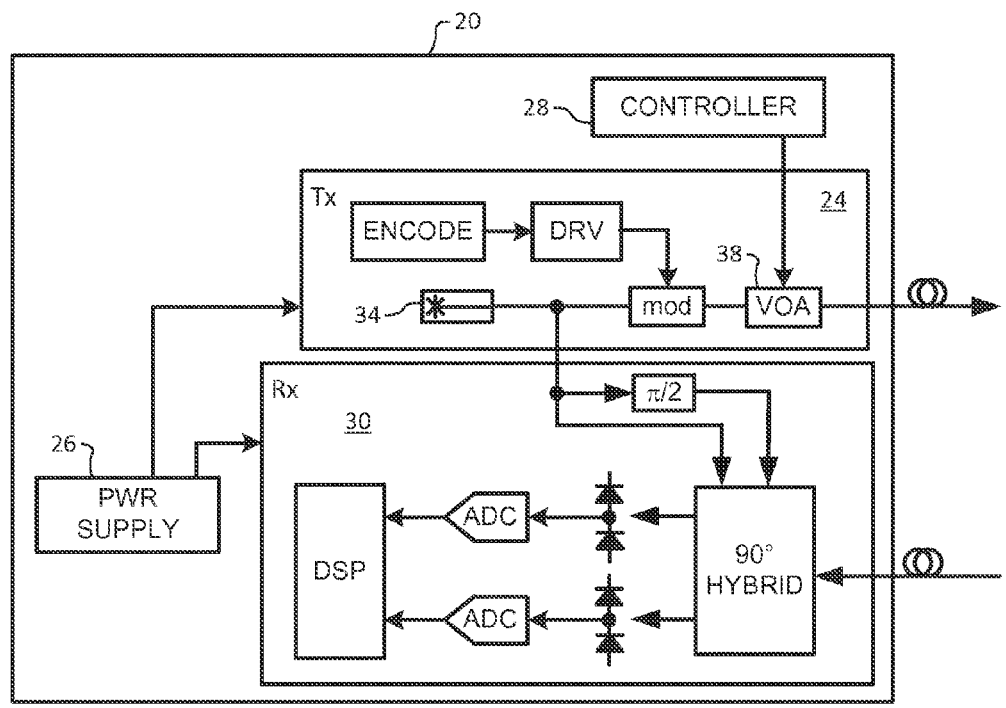

FIGS. 2A-2C schematically illustrate respective optical transceivers 20 of a type that is usable in the present technique. However, it will be appreciated that the illustrated transceivers are representative only. Other suitable transceiver architectures will be apparent to those of ordinary skill in the art, and may be used in the present techniques.

FIG. 2A illustrates a transceiver 20 that comprises a direct detection receiver 22, a transmitter 24, a power supply 26 and a controller 28. FIG. 2B illustrates a transceiver 20 that comprises a coherent receiver 30 having a local oscillator laser 32 that is independent of the transmitter laser 34. In both of the transceivers of FIGS. 2A and 2B, the transmitter and receiver s are sufficiently independent of one another that they can be independently activated. In the schematic illustrations of FIGS. 2A and 2B this is shown by means of a switch 36 controlled by the controller 28, and connected to control the supply of power to the transmitter laser 34. With this arrangement, when power is supplied to the transceiver 20, the receiver 22, 30 (and possibly some of the transmitter 24 circuitry) will receive power and so will be activated immediately. However, the transmitter laser 34 will not receive power, and so will not begin generating output light, until the controller 28 activates the switch to supply power to the laser 34. In more general terms, for the purposes of the present technique the transmitter 24 may be referred to as being disabled, or maintained in a disabled state, if it is being prevented (by any suitable means) from transmitting light into the network. Conversely, for the purposes of the present technique the transmitter 24 may be referred to as being enabled, or switched to an enabled state, if it is being enabled (again, by any suitable means) to transmit light into the network.

FIG. 2C illustrates a transceiver 20 that comprises a coherent receiver 30 that uses a local oscillator signal tapped from the transmitter laser 34. As may be appreciated, this arrangement provides a simple arrangement for ensuring that the transmitter and receiver s are tuned to operate at the same wavelength. However, it also means that power must be supplied to the transmitter laser 34 in order for the receiver 30 to operate. Accordingly, independent enablement/disablement of the transmitter 24 is provided by a Variable Optical Attenuator (VOA) 38 controlled by the controller and connected on the transmitter laser output, which enables the controller 28 to selectively suppress the optical signal output from the transmitter 24.

Figure 3:
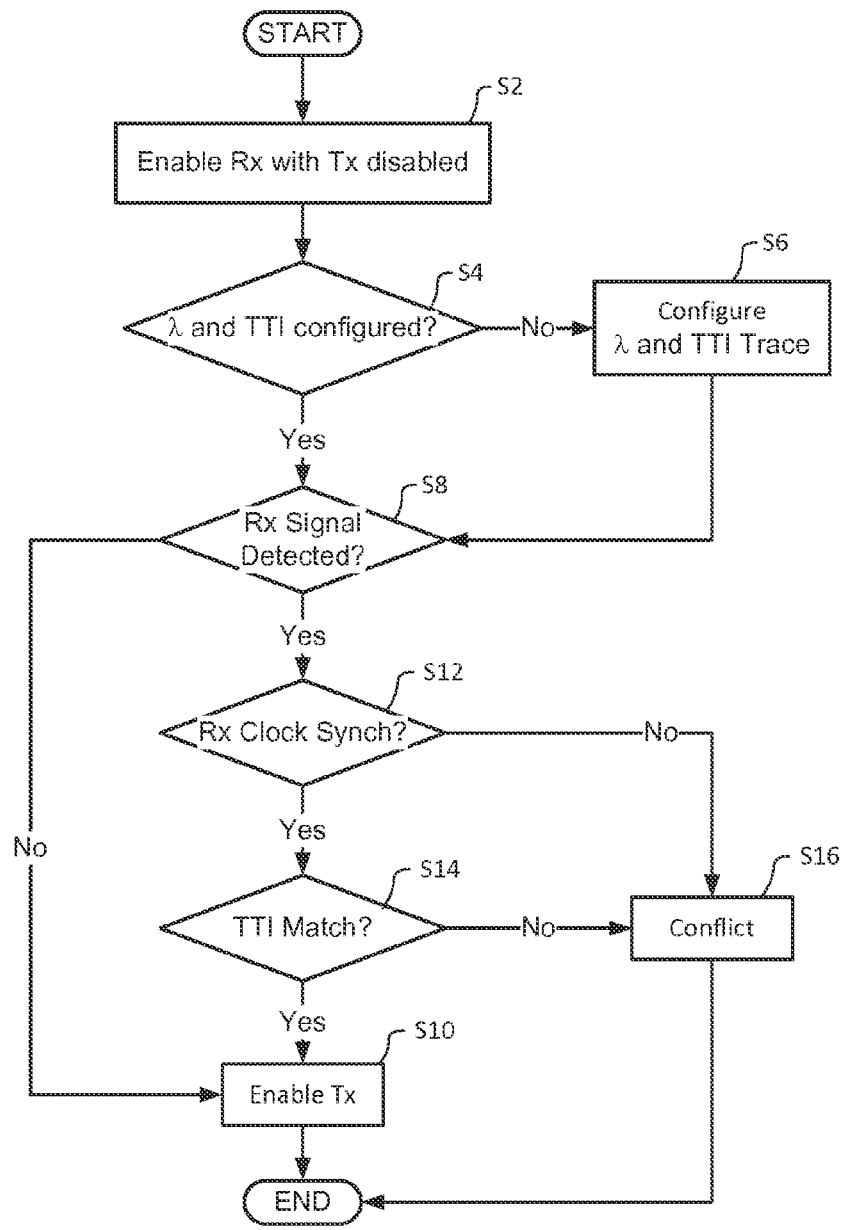
FIG. 3 is a flow-chart illustrating principal steps in a representative process in accordance with an aspect of the present invention.

FIG. 3 is a flow-chart illustrating principal steps in a representative process for automatically detecting a potential wavelength collision. In some embodiments, this process may be executed by the transceiver controller, in accordance with suitable software instructions stored in a non-volatile memory (not shown) of the transceiver.

As may be seen in FIG. 3, the process begins when the transceiver 20 is powered-up (step S2). In accordance with the present technique the power-up sequence is configured so that the receiver is active and the transmitter is disabled, for example by means of the techniques described above with reference to FIGS. 2A-C. The configuration of the transceiver 20 is then examined (at S4) to determine whether or not the operating wavelength λ of the transceiver and Trail Trace Information (TTI) have been preconfigured. As is known in the art, Trail Trace Information (TTI) is composed of data that is to be inserted within the overhead portion of the ITU G.709 baseband data framing structure, which is used to identify the signal from its source to its destination within the network. The TTI contains the access point identifiers (APIs), which are used to specify the source access point identifier (SAPI) and destination access point identifier (DAPI) of the baseband data frames.

In some embodiments, the configuration information may be stored in a non-volatile memory of the transceiver 20, but this is not essential. If the operating wavelength λ and the TTI have not been configured, the controller may perform (at S6) this operation automatically (for example based on stored configuration information) or else may wait for the operating wavelength λ and the TTI to be configured (for example manually by a technician).

Once the operating wavelength λ and the TTI have been configured, the controller determines (at step S8) whether or not the receiver is able to detect the presence of an inbound optical signal at the configured operating wavelength λ. In some embodiments this determination may be made by comparing the optical power level detected by the receiver with a predetermined threshold. This solution allows the Receiver to distinguish signal presence from noise (e.g. Amplified Spontaneous Emission (ASE)) presence at the configured wavelength, for example. If the receiver does not detect a signal at the configured operating wavelength λ, then it can be inferred that there is no risk of collision between the configured operating wavelength λ and any other signals in the network. Accordingly, the Transmitter can be enabled (at Step S10) and so begin transmission at the configured operating wavelength λ. On the other hand, if the receiver detects a signal at the configured operating wavelength λ, then it can be inferred that either: there is a risk of a collision between the configured operating wavelength λ and another signal in the network; or else the transceiver's counterpart in another node has already enabled its transmitter at the configured operating wavelength λ. In order to distinguish between these two possibilities, the controller 28 attempts to check the TTI of the inbound optical signal.

Accordingly, the controller 28 determines (at step S12) whether or not the receiver is able to synchronize its clock with the inbound signal. As is well known in the art, a typical clock recovery circuit in a receiver will raise an "out of clock" signal to indicate that it is either unable to synchronize, or has lost synchronization, with the inbound signal. This "out of clock" signal is commonly supplied to the transceiver controller 28, and so is readily available for use in the present technique. If the receiver is able to synchronize its clock with the inbound signal, then it may be inferred that the received signal is in fact an optical signal (rather than ASE), and the controller 28 compares (at step S14) the TTI data in the received optical signal with the corresponding information configured for the transceiver 20. For example, if either the SAPI contained in the received TTI corresponds with the known source address of the counterpart transceiver and/or the DAPI contained in the received TTI corresponds with the transceiver's (or, more generally, the receiver's) own address then a match condition can be considered to exist. If a match condition exists (at S14) between the two sets of TTI information, then it can be inferred that the received optical signal has originated at the transceiver's counterpart in another node. Accordingly, the Transmitter 24 can be enabled (at step S10) and so begin transmission at the configured operating wavelength λ.

On the other hand, if the receiver is not able to synchronize its clock with the inbound signal (at S12), then it is not possible to check the TTI, and therefore it is not possible to eliminate the possibility of a wavelength conflict. In this case, the controller 28 operates to maintain the disabled state of the transmitter. In some embodiments, the controller may also raise an alarm state (at step S16) indicating that a potential wavelength conflict exists. Based on the alarm state, a service technician may take various steps to identify and resolve the problem.

If the receiver is able to synchronize its clock with the inbound signal (at S12) but there is a mismatch (at S14) between the configured TTI and that of the received signal, then it can be confirmed that there is a conflict between the configured wavelength λ and a signal already in use in the network. Accordingly the controller 28 operates to maintain the disabled state of the transmitter 24. In some embodiments, the controller may also raise an alarm state (at S16) indicating that a potential wavelength conflict exists. Based on the alarm state, a service technician may take various steps to identify and resolve the problem.

Figure 4:
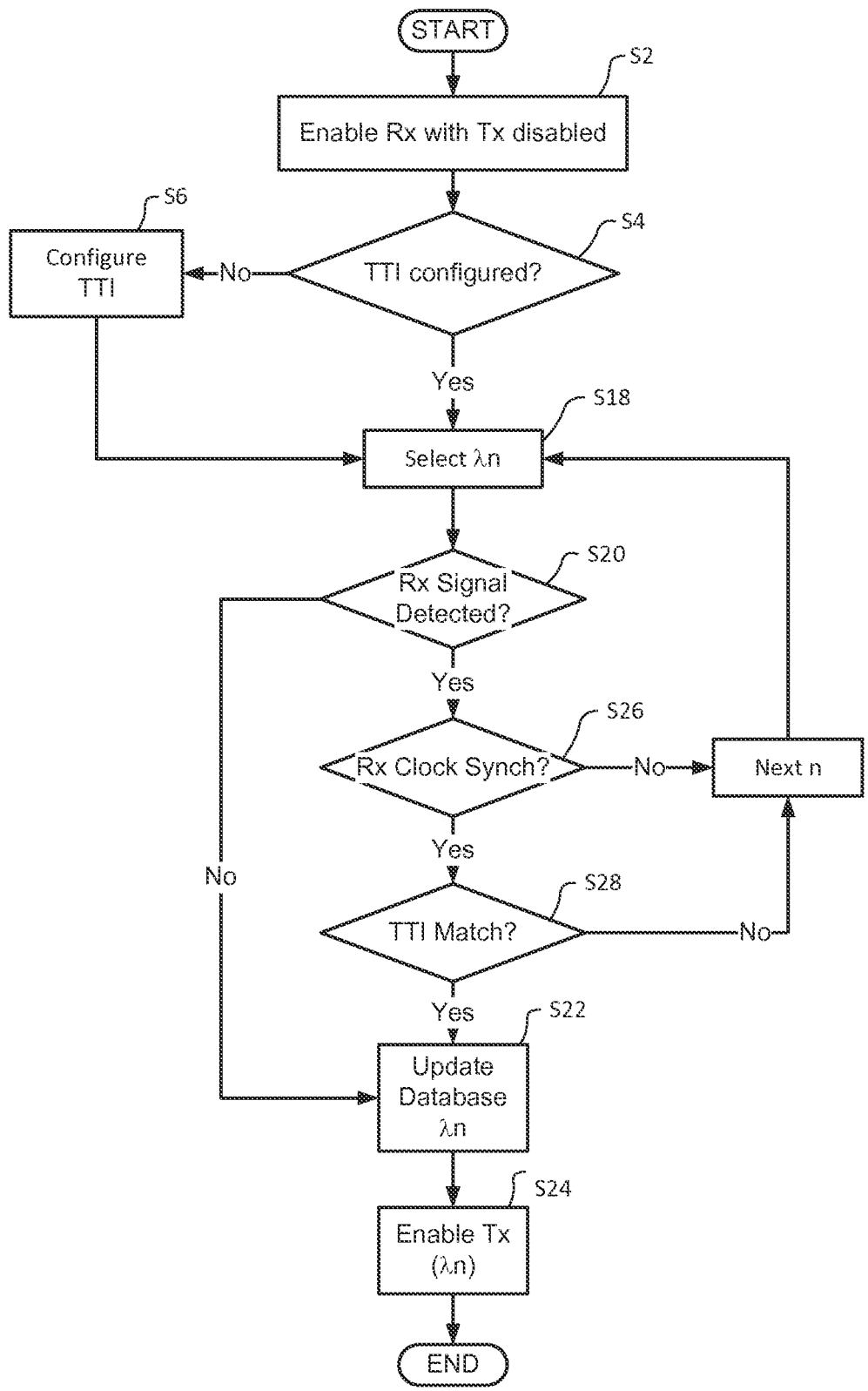
FIG. 4 is a flow-chart illustrating principal steps in a representative process in accordance with another aspect of the present invention.

FIG. 4 is a flow-chart illustrating principal steps in a process for automatically selecting an available wavelength for communication with another transceiver in the network. In some embodiments, this process may be executed by the transceiver controller 28, in accordance with suitable software instructions stored in a non-volatile memory of the transceiver.

As may be seen in FIG. 4, the process begins when the transceiver is powered-up (at S2). In accordance with the present technique the power-up sequence is configured so that the receiver is activated and the transmitter 24 is maintained in a disabled state, for example by means of the techniques described above with reference to FIGS. 2A-C. The configuration of the transceiver 20 is then examined (at S4) to determine whether or not the TTI trace information have been preconfigured. In some embodiments, the configuration information may be stored in a non-volatile memory of the transceiver, but this is not essential. If the TTI has not been configured, the controller 28 may perform this operation automatically (for example based on stored configuration information) or else may wait for the TTI trace information to be configured (for example manually by a technician).

Once the TTI has been configured (at step S6), the controller 28 selects a first candidate wavelength $\lambda$n (at S18). In some embodiments, the candidate wavelength $\lambda$n may be selected from a list of wavelengths in the network (for example, by a technician). In some embodiments, the candidate wavelength $\lambda$n may be automatically selected by analysing a database of wavelength usage to identify wavelengths that are expected to be available for use. Once the candidate wavelength $\lambda$n has been selected (at S18), the controller 28 determines (at S20) whether or not the receiver is able to detect the presence of an inbound optical signal at the candidate wavelength $\lambda$n. In some embodiments this determination may be made by comparing the optical power level detected by the receiver with a predetermined threshold. This solution allows the Receiver to distinguish an optical signal from noise (e.g. Amplified Spontaneous Emission (ASE)) at the candidate wavelength $\lambda$n. If the receiver does not detect a signal at the candidate wavelength $\lambda$n, then it can be inferred that there is no risk of collision between the candidate wavelength $\lambda$n and any other signals in the network. Accordingly, the usage database can be updated (at S22) to show that the candidate wavelength $\lambda$n is now in use, and the Transmitter can be enabled (at S24) and so begin transmission at an operating wavelength $\lambda$ corresponding to the candidate wavelength $\lambda$n. On the other hand, if the receiver does detect (at S20) a signal at the candidate wavelength $\lambda$n, then it can be inferred that either: there is a risk of a collision between the candidate wavelength $\lambda$n and another signal in the network; or else the transceiver's counterpart in another node has already enabled its transmitter at the candidate wavelength $\lambda$n. In order to distinguish between these two possibilities, the controller 28 attempts to check the TTI of the inbound optical signal.

Accordingly, the controller 28 determines (at S26) whether or not the receiver is able to synchronize its clock with the inbound signal. If the receiver is able to synchronize its clock with the inbound signal, then it may be inferred that the received signal is in fact an optical signal (rather than ASE), and the controller 28 compares (at S28) TTI in the received optical signal with the corresponding information configured for the transceiver 20. If a match condition exists (at S28) between the two sets of TTI information, then it can be inferred that the received optical signal has originated at the transceiver's counterpart in another node. Accordingly, the usage database can be updated (at S22) to show that the candidate wavelength $\lambda$n is now in use, and the Transmitter can be enabled (at S24) and so begin transmission at an operating wavelength $\lambda$ corresponding to the candidate wavelength $\lambda$n.

On the other hand, if the receiver is not able to synchronize its clock with the inbound signal (at S26), then it is not possible to check the TTI trace information of the received signal, and therefore it is not possible to eliminate the possibility of a conflict. In this case, the controller 28 operates to maintain the disabled state of the transmitter and proceeds to repeat the above processing at steps S18-S28 with a new candidate wavelength.

If the receiver is able to synchronize its clock with the inbound signal (at S26) but there is a mismatch (at S28) between the configured TTI trace information and that of the received signal, then it can be confirmed that there is a conflict between the candidate wavelength $\lambda$n and a signal already in use in the network. Accordingly the controller 28 operates to maintain the disabled state of the transmitter and proceeds to repeat the above processing at steps S18-S28 with a new candidate wavelength.

In the embodiments discussed above, TTI trace information is used to detect whether or not a received optical signal is from a counterpart transceiver (that is, a transceiver with which the current transceiver is intended to communicate). It will be appreciated, that the use of TTI trace information for this purpose is not limitative of the present invention. As is known in the art, other baseband data framing protocols support functionality similar to TTI, and so may be suitable for use in the present technique. For example, in SONET/SDH, the J0 overhead byte is used for a similar purpose. More generally, any suitable feature of the received signal (e.g. data modulated on the signal or a suitable property of the signal itself) that is indicative of the transmitting transceiver may be used for the purposes of the present technique.

As may be appreciated, the methods described above enable transceivers to automatically establish bidirectional communication through the network, based solely on the preconfigured matching TTI trace information in each transceiver. For example, if both transceivers are preconfigured with matching TTI, then the first one of the two transceivers to power up will complete its validation process (according to FIG. 3 or 4, as appropriate) first, and begin transmitting its TTI on its configured (or selected) wavelength. The second transceiver to power up will, following exactly the same start-up process, discover the wavelength being used by its corresponding transceiver and enable its transceiver to begin transmitting on that wavelength. Once both transceivers detect the TTI trace information from their counterpart, conventional "hand-shaking" methods may be used to establish and maintain bi-directional communications between the two transceivers.

In the foregoing description, the present technique was described by way of examples in which control of the transmitter and receiver functions of the transceiver is implemented by means of a controller 28 that is integrated within the transceiver 14. However, it will be appreciated that this is not essential. Rather any suitable technique may be used to enable that the receiver can be started while maintaining the transmitter in a disabled state. For example, the controller 28 may not be associated with the receiver per se, but rather may be part of a remote controller. Similarly, the Variable Optical Attenuator (VOA) 38 of FIG. 2C may be replaced by any suitable device capable of selectively blocking light emitted from the transmitter. For example, the VOA 38 of FIG. 2C may be replaced by any suitable combination of optical switches, attenuators, shutters, etc. capable of selectively blocking light from the transmitter in response to a control signal from the controller 28. Such a blocker device may be integrated within the transceiver 20 as shown in FIG. 2C (either as part of the transmitter, or as a separate component), or may be located at any suitable location within the Add path 10. For example, the coupler 18 could be provided as a Wavelength Selective Switch (WSS), in which case the WSS may be controlled to provide the necessary blocking function by preventing light from the "disabled" transmitter from propagating into the downstream optical fiber link.

Figure 5:
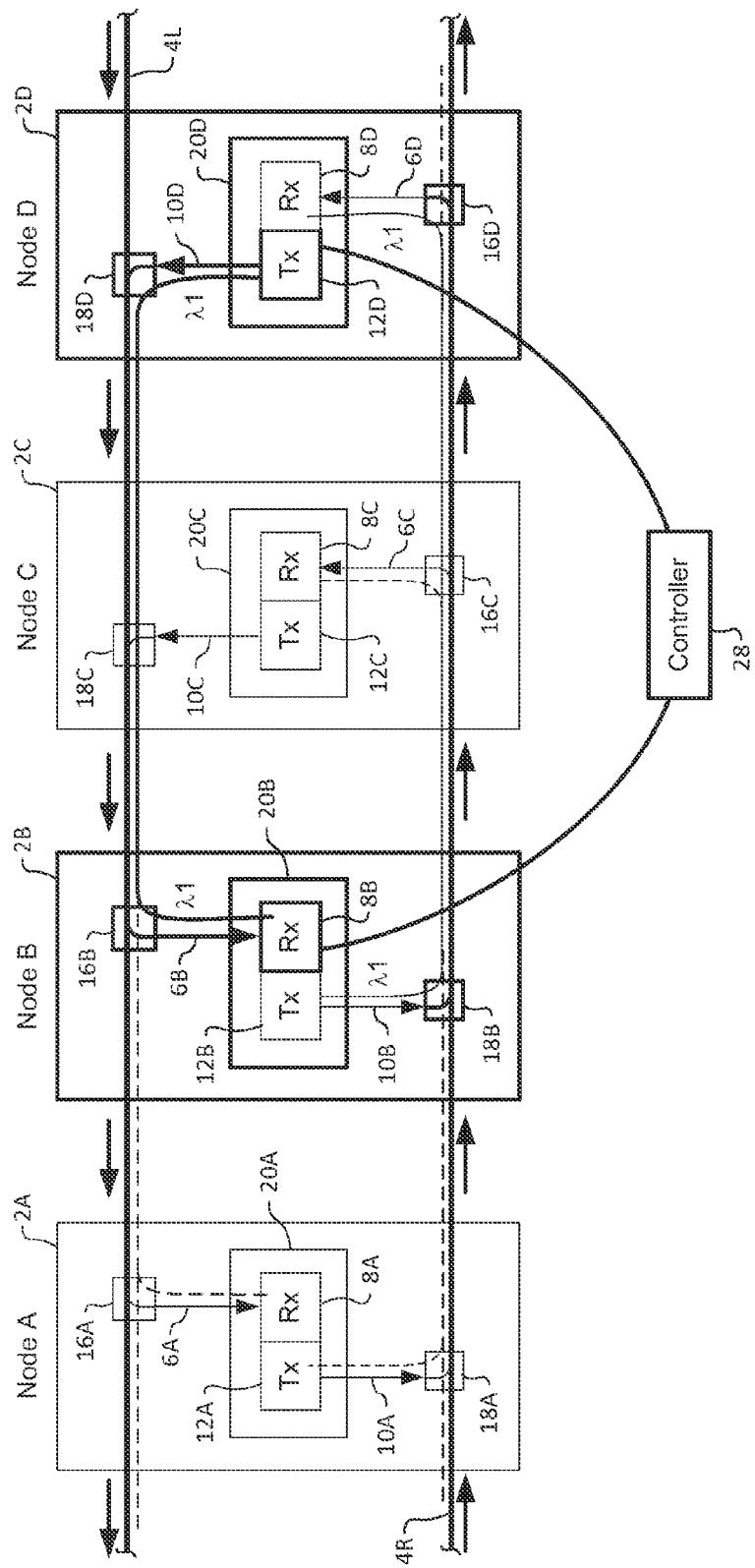
FIG. 5 is a block diagram schematically illustrating an alternative embodiment of the present technique.

In the foregoing description, the present technique is described by way of example embodiments in which receiver 8 and transmitter 12 functions are integrated into a common transceiver 20, and a controller 28 is used to control the receiver function 8 so as to detect potential wavelength conflicts before enabling the transmitter function 12. However, it will be appreciated that the present technique is not limited to such embodiments. For example, FIG. 5 illustrates an embodiment in which a controller 28 is configured to control a receiver 8B and a transmitter 12D is respective different nodes 2 of the network. In the arrangement of FIG. 5, the controller 28 may interact with the receiver 8B and transmitter 12D to implement the methods described above with reference to FIGS. 3 and 4 to detect potential wavelength conflicts prior to enabling operation of the transmitter 12D. This arrangement has an advantage in that it enables the controller to use a downstream receiver to check for potential wavelength conflicts prior to enabling operation of the upstream transmitter.

The embodiments of the invention described herein are intended to be illustrative only. The scope of the invention is therefore intended to be limited solely by the scope of the appended claims.

We claim:

1. A method of using a transmitter and a receiver in an optical network, the method comprising:
   a) enabling the receiver while maintaining the transmitter in a disabled state;
   b) detecting, by the receiver, a presence of an optical signal at a first wavelength;
   c) responsive to detection that an optical signal at the first wavelength is not present, enabling the transmitter to transmit light; at the first wavelength; and
   d) responsive to detection that an optical signal at the first wavelength is present:
      detecting a feature in overhead of the optical signal,
      detecting a match condition between the detected feature of the optical signal and a predetermined feature of the transmitter, and
      enabling the transmitter to transmit light responsive to detection of the match condition.

2. The method as claimed in claim 1, wherein maintaining the transmitter in a disabled state comprises preventing the transmitter from transmitting light into the optical network at the first wavelength.

3. The method as claimed in claim 1, wherein the receiver and the transmitter are integrated into a common transceiver.

4. The method as claimed in claim 1, wherein the first wavelength in the optical network is preconfigured.

5. The method as claimed in claim 1, wherein the feature is detected in Trail Trace Information (TTI) in the overhead.

6. The method as claimed in claim 5, wherein the common transceiver is in a first node and communicatively coupled to the corresponding common transceiver in a second node.

7. The method as claimed in claim 5, wherein the transmitter is enabled responsive to the detection of an associated transmitter of a corresponding common transceiver by the receiver thereby eliminating wavelength conflicts in the optical network.

8. The method as claimed in claim 1, wherein the step of detecting, a presence of an optical signal at a first wavelength comprises:
   detecting, by a clock recovery circuit of the receiver, whether or not an "out of clock" condition exists;
   determining that it is not possible to check that an optical signal at the first wavelength is not present when an "out of clock" condition does exist and maintaining the transmitter in the disabled state; and
   determining whether an optical signal at the first wavelength is present when an "out of clock" condition does not exist.

9. The method as claimed in claim 1, wherein the feature of the detected optical signal comprises information modulated on the detected optical signal.

10. The method as claimed in claim 9, wherein the information modulated on the detected optical signal comprises Trail Trace Information (TTI) modulated on the detected optical signal by a counterpart transceiver of the network.

11. The method as claimed in claim 9, wherein the information modulated on the detected optical signal comprises information indicative of a counterpart transceiver of the network.

12. An apparatus for use in an optical network, the apparatus comprising:
   a transmitter configured to transmit an optical signal into the optical network;
   a receiver configured to receive an optical signal via the optical network; and
   a controller connected to the transmitter and the receiver, the controller configured to:
      a) enable the receiver while maintaining the transmitter in a disabled state;
      b) detect a presence of an optical signal at a first wavelength;
      c) responsive to detection that an optical signal at the first wavelength is not present, enable the transmitter to transmit light; at the first wavelength; and
      d) responsive to detection that an optical signal at the first wavelength is present:
         detect a feature in overhead of the optical signal;
         detect a match condition between the detected feature of the optical signal and a predetermined feature of the transmitter; and
         enable the transmitter to transmit light responsive to detection of the match condition.

13. The apparatus as claimed in claim 12, further comprising a blocker responsive to the controller and configured to selectively block light at the first wavelength emitted by the transmitter from propagating into the optical network.

14. The apparatus as claimed in claim 13, wherein the blocker comprises any one or more of:
   a Variable Optical Attenuator (VOA) connected to an output of the transmitter;
   a Wavelength Selective Switch (WSS) connected to an output of the transmitter; and
   a power supply of the transmitter.

15. The apparatus as claimed in claim 12, wherein the feature is detected in Trail Trace Information (TTI) in the overhead.

16. The apparatus as claimed in claim 12, wherein the feature of the detected optical signal comprises information modulated on the detected optical signal.

17. The apparatus as claimed in claim 16, wherein the information modulated on the detected optical signal comprises TTI trace information modulated on the detected optical signal by a counterpart transceiver of the network.

18. The apparatus as claimed in claim 16, wherein the information modulated on the detected optical signal comprises information indicative of a counterpart transceiver of the network.

19. The apparatus as claimed in claim 12, wherein the receiver and the transmitter are integrated into a common transceiver.

20. The apparatus as claimed in claim 19, wherein the transceiver includes the controller.

21. The apparatus as claimed in claim 19, wherein the common transceiver is in a first node and communicatively coupled to the corresponding common transceiver in a second node.

22. The apparatus as claimed in claim 19, wherein the transmitter is enabled responsive to the detection of an associated transmitter of a corresponding common transceiver by the receiver thereby eliminating wavelength conflicts in the optical network.

\* \* \* \* \*